US012782494B2

(12) United States Patent
Golsch et al.

(10) Patent No.: US 12,782,494 B2
(45) Date of Patent: Nov. 3, 2026

(54) SYSTEM AND METHOD FOR RANGING WITH CHANNEL SOUNDING

(71) Applicants: DENSO International America, Inc., Southfield, MI (US); DENSO CORPORATION, Kariya (JP)

(72) Inventors: Kyle Golsch, Pontiac, MI (US); Eric J. Smith, Holland, MI (US); Karl Jager, Zeeland, MI (US); Kyle Cooper, Plainwell, MI (US); Mitch Johnson, Southfield, MI (US); Daniel Lee, Salt Lake City, UT (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 285 days.

(21) Appl. No.: 18/619,380

(22) Filed: Mar. 28, 2024

(65) Prior Publication Data

US 2025/0208251 A1 Jun. 26, 2025

Related U.S. Application Data

(60) Provisional application No. 63/612,764, filed on Dec. 20, 2023.

(51) Int. Cl.

| | |
|---|---|
| ***G01S 5/02*** | (2010.01) |
| ***G01S 5/14*** | (2006.01) |
| ***H04L 25/02*** | (2006.01) |

(52) U.S. Cl.
CPC .............. *G01S 5/0284* (2013.01); *G01S 5/14* (2013.01); *H04L 25/0224* (2013.01)

(58) Field of Classification Search
CPC ....... G01S 5/0284; G01S 5/14; H04L 25/0224
USPC .......................................................... 342/458
See application file for complete search history.

(56) References Cited

U.S. PATENT DOCUMENTS

| | | | | |
|---|---|---|---|---|
| 9,794,753 | B1 | 10/2017 | Stitt et al. | |
| 11,272,559 | B2 | 3/2022 | Smith | |
| 2023/0075008 | A1 | 3/2023 | Cooper et al. | |
| 2023/0221402 | A1 | 7/2023 | Ahmed et al. | |
| 2025/0216498 | A1* | 7/2025 | Ramirez | H04W 4/48 |
| 2025/0227658 | A1* | 7/2025 | Cooper | H04W 64/003 |

FOREIGN PATENT DOCUMENTS

| | | | | | |
|---|---|---|---|---|---|
| CN | 117082616 | A | * | 11/2023 | H04W 64/00 |
| DE | 102015210476 | A1 | * | 1/2016 | G01S 5/0218 |
| WO | WO-2020077234 | A9 | * | 5/2021 | H04W 12/64 |
| WO | WO-2024030069 | A1 | * | 2/2024 | H04L 5/001 |

* cited by examiner

*Primary Examiner* — Harry K Liu
(74) *Attorney, Agent, or Firm* — Warner Norcross + Judd LLP

(57) ABSTRACT

A system and method are provided for determining location information of a remote device relative to an object based on a phase-based range.

18 Claims, 9 Drawing Sheets

SYSTEM AND METHOD FOR RANGING WITH CHANNEL SOUNDING

FIELD OF INVENTION

The present disclosure relates to a system and method for determining a distance between a remote device and an object, such as a vehicle.

BACKGROUND

Real-time location or position determinations for objects have become increasingly prevalent across a wide spectrum of applications. Real-time locating systems (RTLS) are used and relied on for tracking objects, such as portable or remote devices, in many realms including, for example, automotive, storage, retail, security access for authentication, and security access for authorization.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

SUMMARY

In general, one innovative aspect of the subject matter described herein can be embodied in a system for determining a distance between a remote device and an object. The system may include a first device disposed in a fixed position relative to the object. The first device may include a first antenna system configured to receive and/or transmit a first tone signal from and/or to the remote device. The system may include a second device disposed in a fixed position relative to the object. The second device may include a second antenna system configured to receive and/or transmit a second tone signal from and/or to the remote device In one embodiment, the system may include a control system configured to direct one of the first and second devices to conduct a channel sounding procedure based on the respective one of the first and second tone signals. The control system may be configured to direct the other of the first and second devices to conduct the channel sounding procedure based on the respective one of the first and second tone signals.

The foregoing and other embodiments can each optionally include one or more of the following features, alone or in combination. In particular, one embodiment includes all the following features in combination.

In some embodiments, the control system may be configured to direct the first one of the first and second devices to transition the channel sounding procedure to the other one of the first and second devices.

In some embodiments, the control system may be configured to determine a first phase characteristic and a second phase characteristic of the first tone signal at a first frequency and a second frequency. The first and second phase characteristics may be indicative of a first phase rotation of the first tone signal between the first device and the remote device. The control system may be operable to determine a first distance between the first device and the remote device based on the first phase rotation of the first tone signal.

In some embodiments, the control system may be configured to determine a third phase characteristic and a fourth phase characteristic of the second tone signal at a third frequency and a fourth frequency. The third and fourth phase characteristics may be indicative of a second phase rotation of the second tone signal between the second device and the remote device. The control system may be operable to determine a second distance between the second device and the remote device based on the second phase rotation of the second tone signal.

In general, one innovative aspect of the subject matter described herein can be embodied in a system for determining a distance between a remote device and an object. The system may include a first device disposed in a fixed position relative to the object. The first device may include a first antenna system configured to receive and/or transmit a first tone signal from and/or to the remote device. The system may include a control system configured to direct the first device to conduct a channel sounding procedure based on the first tone signal, and configured to direct the first device to prioritize communications with the remote device relative to communications with one or more other devices.

The foregoing and other embodiments can each optionally include one or more of the following features, alone or in combination. In particular, one embodiment includes all the following features in combination.

In some embodiments, the control system may be configured to direct the first device to dynamically adjust device priorities based on real time conditions.

In some embodiments, the control system may be configured to direct the first device to prioritize according to round robin scheduling.

In general, one innovative aspect of the subject matter described herein can be embodied in a system for determining a distance between a remote device and an object. The system may include a first device disposed in a fixed position relative to the object. The first device may include a first antenna system configured to receive and/or transmit a first tone signal from and/or to the remote device. The system may include a control system configured to direct the first device to conduct a channel sounding procedure based on the first tone signal, and configured to direct the first device to change the channel sounding procedure based on at least one of the quality of data, the position of the remote device, and the velocity of the remote device.

The foregoing and other embodiments can each optionally include one or more of the following features, alone or in combination. In particular, one embodiment includes all the following features in combination.

In some embodiments, the control system may be operable to transition from a first channel sounding configuration for coarse localization to a second channel sounding configuration for fine localization.

In some embodiments, the control system may be configured to utilize round-robin or intelligent selection to transition from the first device to a second device configured to conduct the channel sounding procedure.

In general, one innovative aspect of the subject matter described herein can be embodied in a method for determining a distance between a remote device and an object. The method may include communicating a first tone signal between the remote device and a first device disposed in a fixed position relative to the object, communicating a second tone signal between the remote device and a second device disposed in a fixed position relative to the object, and directing one of the first and second devices to conduct a channel sounding procedure based on the respective one of the first and second tone signals. The method may include directing the other of the first and second devices to conduct the channel sounding procedure based on the respective one of the first and second tone signals.

The foregoing and other embodiments can each optionally include one or more of the following features, alone or in combination. In particular, one embodiment includes all the following features in combination.

In some embodiments, the method may include directing the one of the first and second devices to transition the channel sounding procedure to the other one of the first and second devices.

In some embodiments, the method may include determining a first phase characteristic and a second phase characteristic of the first tone signal at a first frequency and a second frequency, where the first and second phase characteristics are indicative of a first phase rotation of the first tone signal between the first device and the remote device.

In some embodiments, the method may include determining a first distance between the first device and the remote device based on the first phase rotation of the first tone signal.

In some embodiments, the method may include determining a third phase characteristic and a fourth phase characteristic of the second tone signal at a third frequency and a fourth frequency, where the third and fourth phase characteristics are indicative of a second phase rotation of the second tone signal between the second device and the remote device.

In some embodiments, the method may include determining a second distance between the second device and the remote device based on the second phase rotation of the second tone signal.

In some embodiments, the method may include directing the first device to dynamically adjust device priorities based on real time conditions.

In some embodiments, the method may include directing the first device to prioritize according to round robin scheduling.

In some embodiments, the method may include transitioning from a first channel sounding configuration for coarse localization to a second channel sounding configuration for fine localization.

In some embodiments, the method may include utilizing round-robin or intelligent selection to transition from the first device to a second device configured to conduct the channel sounding procedure.

DETAILED DESCRIPTION

I. Location System Overview

A system and method for determining location information of a remote device relative to an object based on a phase-based range is provided. The system and method may determine a location of the remote device based on a phase-based range for first communications between a first object device (e.g., a sensor [also described as an anchor]) and the remote device and a phase-based range for the first communications monitored by a second object device (e.g., a sensor [also described as an anchor]). A clock difference may be determined between the first device and the second device, and the clock difference may form the basis for a phase-based range determination for the first communications monitored by the second object device. The clock difference may be determined repeatedly. The phase-based range may be based on a signal characteristic of communication determined with respect to the first communications, such as a determined phase rotation of the first communications between the remote device and the first object device and a determined phase rotation of the first communications between the remote device and the second object device.

In one aspect, the location of the remote device may be determined based on a phase-based range for second communications between the second object device and the remote device and a phase-based range for the second communications monitored by the first object device.

The object in one embodiment may be mobile, such that its environment may change depending on the location of the object. For instance, in the case of the object being a vehicle, the vehicle may be stored in an enclosed garage with a movable barrier at night, and then driven to and parked in an open-air parking lot, with one or more other vehicles in proximity thereto. The environmental configuration of these locations can vary in significant ways relative to RF or wireless communications, and the environmental configuration may vary in time even when the object is not moving relative to the environment. Such changes in the environment, as well as possible additional factors, may affect a clock difference between the first device on the second device relative to wireless communications. Additional examples of a system with adapting for environmental conditions is described in U.S. Pat. No. 10,869,161, entitled SYSTEM AND METHOD OF DETERMINING REAL-TIME LOCATION, issued Dec. 15, 2020, to Smith.

In one embodiment, a locator may be provided to determine the location information about the remote device relative to the object based on a signal characteristic of communications with the remote device. It should be understood that the present disclosure is not limited to determining the location information based on a single signal characteristic of communications; one or more additional signal characteristics of the communications may be used as a basis by the locator to determine the location information.

Figure 4:
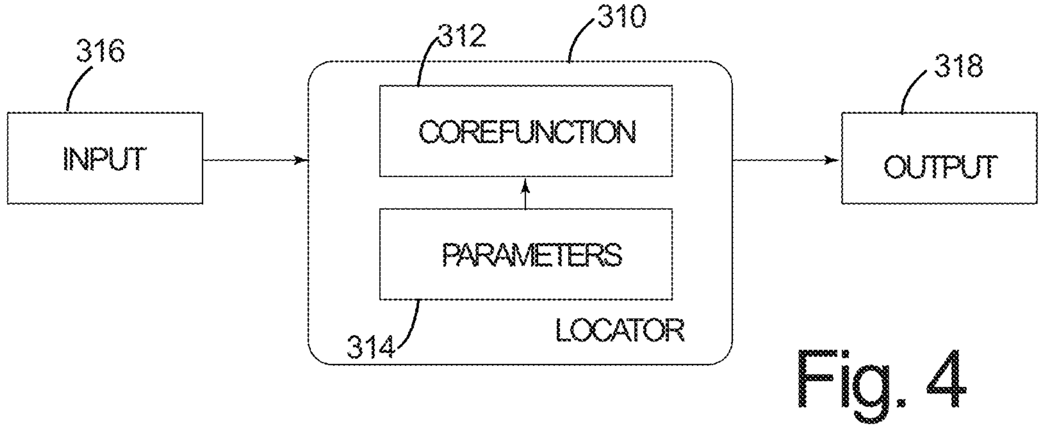
FIG. 4 shows a portion of the device of the system in accordance with one embodiment.

A locator 310, as depicted in FIG. 4, may include a core function 312 operable in conjunction with one or more parameters 314 to determine the location information based on one or more inputs 316, such as at least one signal characteristic of wireless communications, and to generate one or more outputs 318 indicative of a location of the remote device 20 relative to the object 10. The values of the one or more parameters may be selected to yield location information for the remote device relative to the object with a degree of confidence for a given environment. For instance, the locator 310 may be configured to determine the location of the remote device relative to the object in an open-air parking lot with no vehicles in proximity thereto or within 4 inches with a degree of confidence of 90% or better. In one embodiment, selecting the values of the one or more parameters may be based on empirical analysis, including obtaining truth data pertaining to an actual location of the remote device relative to the object along with, for each actual location, at least one sample of at least one signal characteristic. As discussed herein, the system may include a plurality of object devices disposed at different locations on the object, such that a plurality of signal characteristics of the wireless communications can be obtained with respect to different positions on the object. The plurality of signal characteristics may be correlated with truth data pertaining to an actual location of the remote device relative to the object, and one or more parameters in conjunction with the core location function may be trained or selected to yield location information that approximates the truth data within a degree of confidence.

Figure 1:
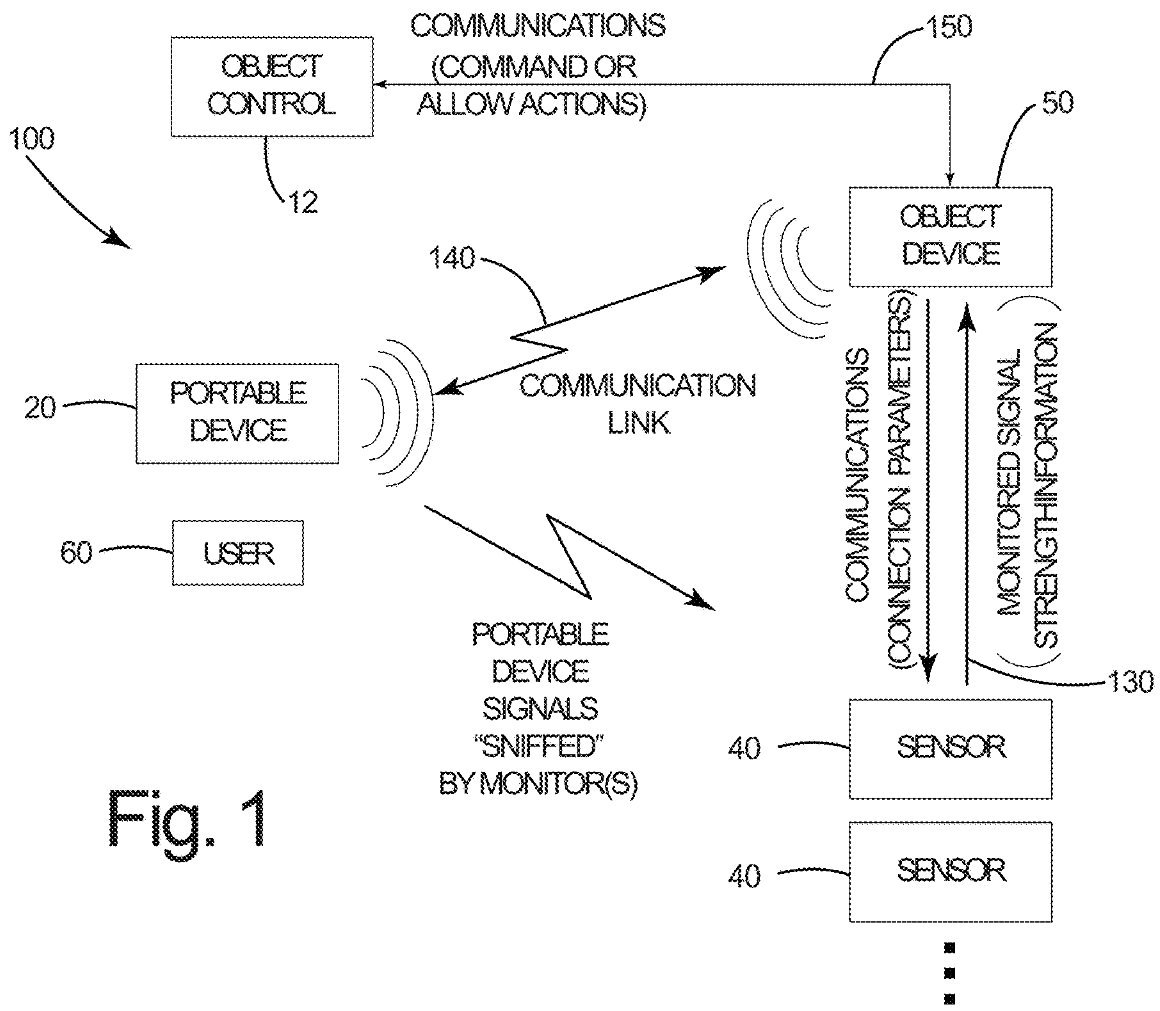
FIG. 1 shows a system in accordance with one embodiment of the present disclosure.
Figure 2:
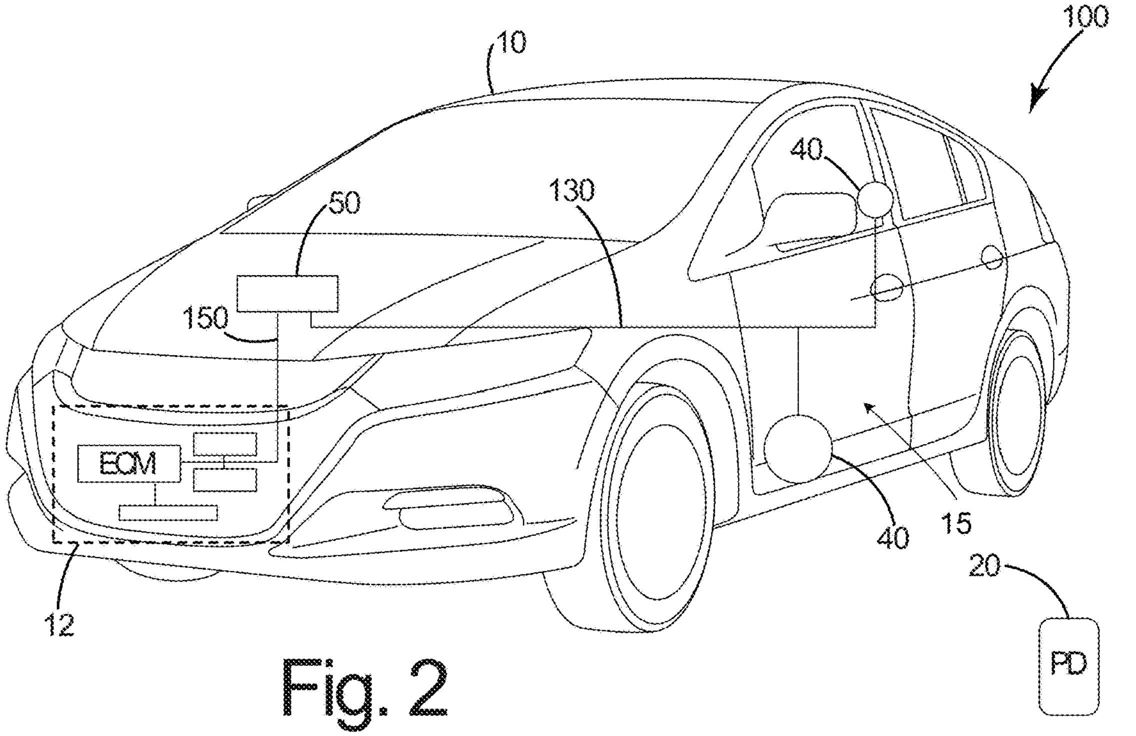
FIG. 2 shows a system in accordance with one embodiment.
Figure 5:
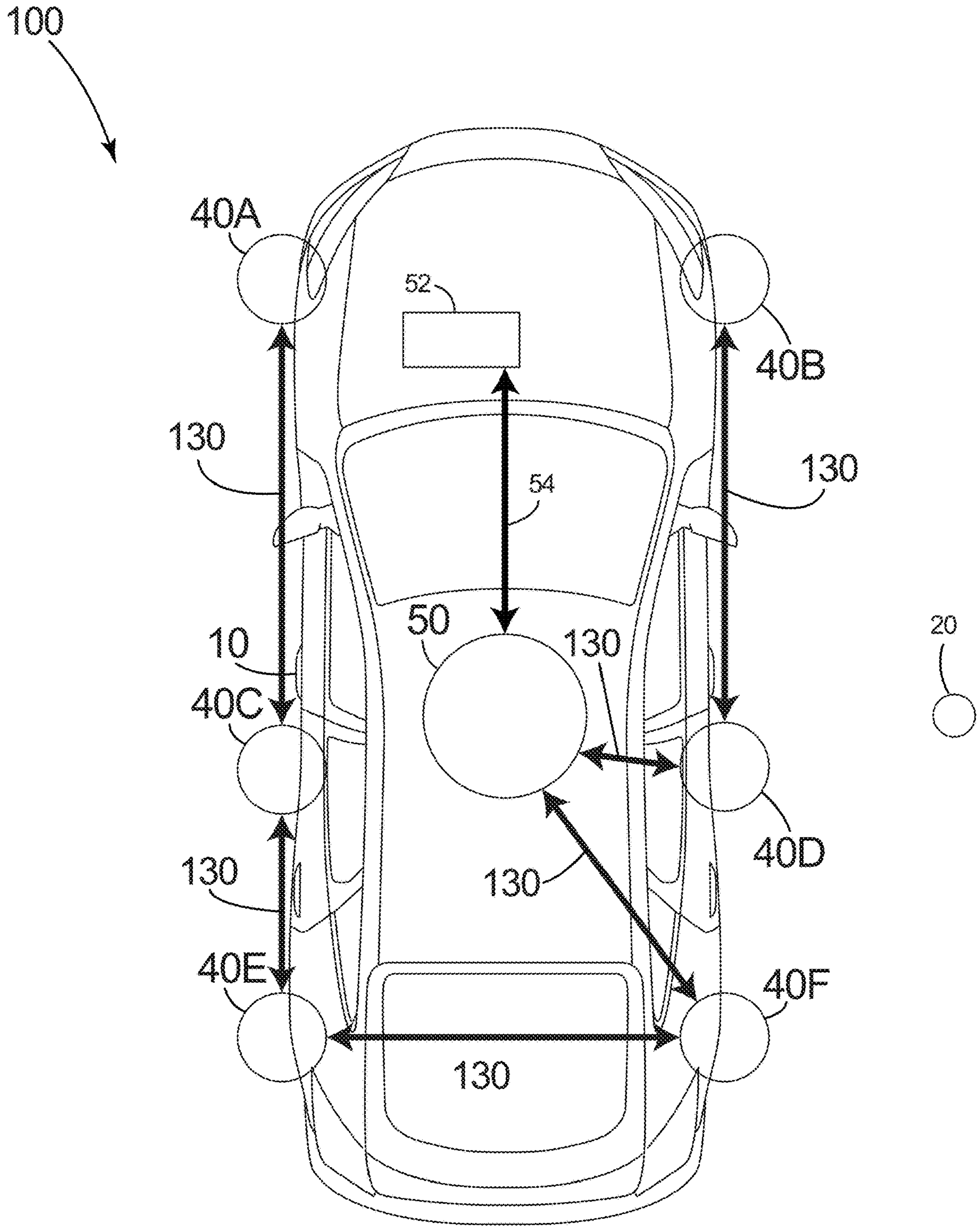
FIG. 5 shows the system in accordance with one embodiment.

A system in accordance with one embodiment is shown in the illustrated embodiment of FIGS. 1, 2, and 5 and generally designated 100. The system 100 may include one or more system components as outlined herein. A system component may be a user 60 or an electronic system component, which may be the remote device 20, a sensor 40, or an object device 50, or a component including one or more aspects of these devices. The underlying components of the object device 50, as discussed herein, may be configured to operate in conjunction with any one or more of these devices. In this sense, in one embodiment, there may be several aspects or features common among the remote device 20, the sensor 40, and the object device 50. The features described in connection with the object device 50 depicted in FIG. 3 may be incorporated into the remote device 20 or the sensor 40, or both. In one embodiment, the object device 50 may form an equipment component disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 12 configured to control operation of the object 10. The object 10 may include one or more communication networks, wired or wireless, that facilitate communication between the object controller 12 and the object device 50. The communication network for facilitating communications between the object device 50 and the object controller 12 is designated 150 in the illustrated embodiment of FIG. 2 and provided as a CAN bus; however, it is to be understood that the communication network is not so limited. The communication network may be any type of network, including a wired or wireless network, or a combination of two or more types of networks.

Figure 3:
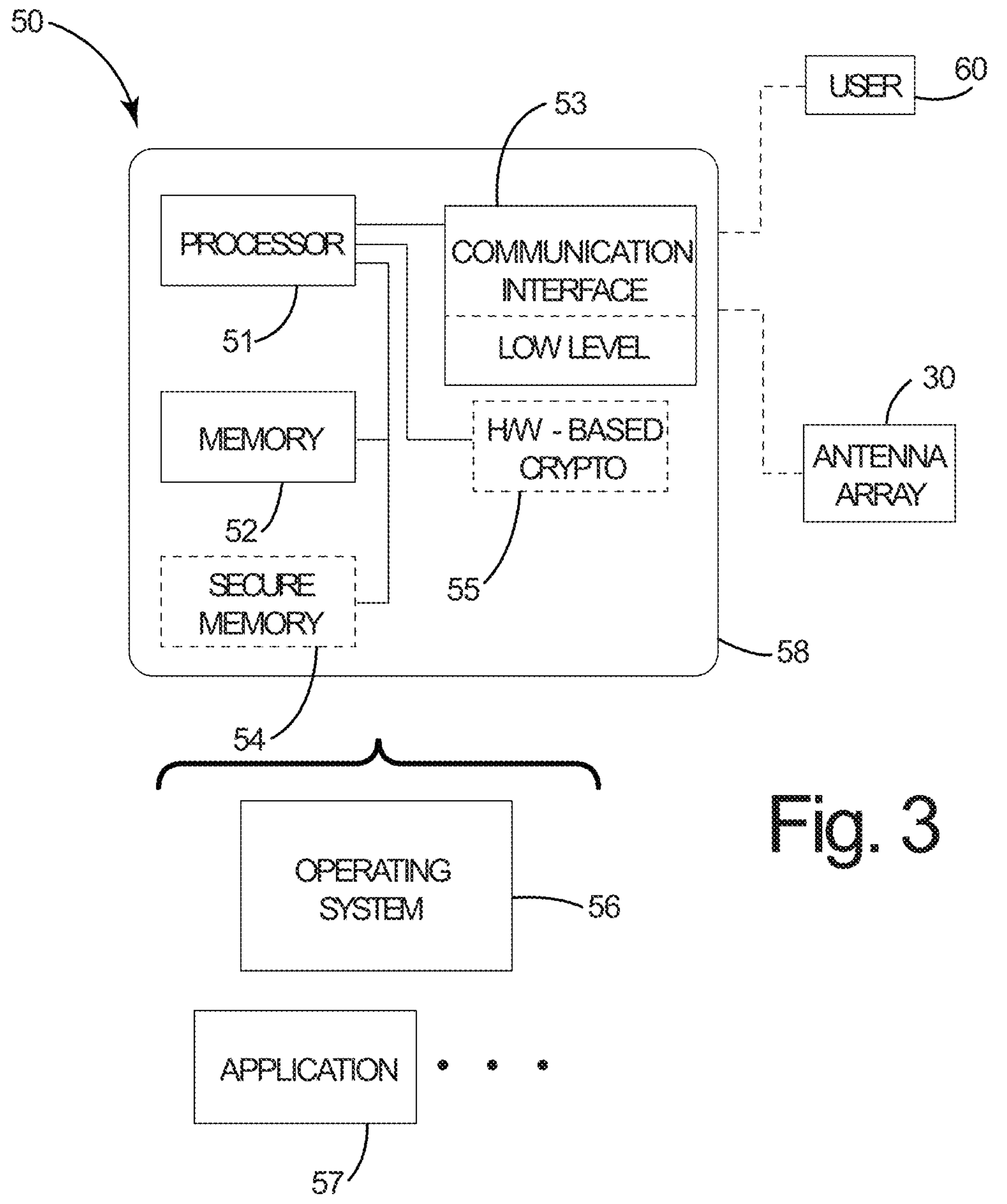
FIG. 3 shows a device of the system in one embodiment.

In the illustrated embodiment of FIG. 3, the object device 50 may include a control system or controller 58 configured to control operation of the object device 50 in accordance with the one or more functions and algorithms discussed herein, or aspects thereof. The system components, such as the remote device 20 or the sensor 40, or both, may similarly include a controller 58.

The controller 58 may include electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to, CAN, LIN, Vehicle Area Network (VAN), FireWire, I2C, RS-232, RS-485, and Universal Serial Bus (USB).

As described herein, the terms locator, module, model, and generator designate parts of the controller 58. For instance, a model or locator in one embodiment is described as having one or more core functions and one or more parameters that affect output of the one or more core functions. Aspects of the model or locator may be stored in memory of the controller 58, and may also form part of the controller configuration such that the model is part of the controller 58 that is configured to operate to receive and translate one or more inputs and to output one or more outputs. Likewise, a module or a generator are parts of the controller 58 such that the controller 58 is configured to receive an input described in conjunction with a module or generator and provide an output corresponding to an algorithm associated with the module or generator.

The controller 58 of the object device 50 in the illustrated embodiment of FIG. 3 may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55—in their absence, cryptographic functions may be performed in software. The object device 50 may or may not have (or have access to) secure memory units 54 (e.g., a secure element or a hardware security module (HSM)). Optional components and communication paths are shown in phantom lines in the illustrated embodiment.

The controller 58 in the illustrated embodiment of FIG. 3 is not dependent upon the presence of a secure memory unit 54 in any component. In the optional absence of a secure memory unit 54, data that may otherwise be stored in the secure memory unit 54 (e.g., private and/or secret keys) may be encrypted at rest. Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered as being confidential (encrypted), authenticated, and integrity-verified. It should be understood, however, that the present disclosure is not so limited, and that the term "secure" may be a subset of these aspects or may include additional aspects related to data security.

The communication interface 53 may be any type of communication link, including any of the types of communication links describe herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including Bluetooth Low Energy (BTLE) communications.

As another example, the communication interface 53 may provide a wireless communication link with another system component in the form of the remote device 20, such as wireless communications according to the Wi-Fi standard. In another example, the communication interface 53 may be configured to communicate with an object controller 12 of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

In one embodiment, the object device 50 may be configured to communicate with one or more auxiliary devices other than another object device 50 or a user. The auxiliary device may be configured differently from the object device 50—e.g., the auxiliary device may not include a processor 51, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the remote device 20. In the illustrated embodiment of FIGS. 1, 2, and 5, the user 60 may carry the remote device 20 (e.g., a smartphone). The system 100 may facilitate locating the remote device 20 with respect to the object 10 (e.g., a vehicle) in real-time with sufficient precision to determine whether the user 60 is located at a position at which access to the object 10 or permission for an object command should be granted.

For instance, in an embodiment where the object 10 is a vehicle, the system 100 may facilitate determining whether the remote device 20 is outside the vehicle but in close proximity, such as within 5 feet, 3 feet, or 2 feet or less, to the driver-side door 15. This determination may form the basis for identifying whether the system 100 should unlock the vehicle. On the other hand, if the system 100 determines the remote device 20 is outside the vehicle and not in close proximity to the driver-side door (e.g., outside the range of 2 feet, 3 feet, or 5 feet), the system 100 may determine to lock the driver-side door. As another example, if the system 100 determines the remote device 20 is in close proximity to the driver-side seat but not in proximity to the passenger seat or the rear seat, the system 100 may determine to enable mobilization of the vehicle. Conversely, if the remote device 20 is determined to be outside close proximity to the driver-side seat, the system 100 may determine to immobilize or maintain immobilization of the vehicle.

The object 10 may include multiple object devices 50 or variant thereof, such as an object device 50 including a sensor 40 coupled to an antenna array 30, in accordance with one or more embodiments described herein.

Micro-location of the remote device 20 may be determined in a variety of ways, such as using information obtained from a global positioning system, one or more signal characteristics of communications from the remote device 20, and one or more sensors (e.g., a proximity sensor, a limit switch, or a visual sensor), or a combination thereof. An example of microlocation techniques for which the system 100 can be configured are disclosed in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIGS. 1-5, the object device 50 (e.g., a system control module (SCM)) and a plurality of sensors 40 (coupled to an antenna array 30 as shown in FIG. 3) may be disposed on or in a fixed position relative to the object 10. Example use cases of the object 10 include the vehicle identified in the prior example, or a building for which access is controlled by the object device 50.

The remote device 20 may communicate wirelessly with the object device 50 via a communication link 140. The plurality of sensors 40 may be configured to monitor (e.g., sniff) the communications of the communication link 140 between the remote device 20 and the object device 50 to determine one or more signal characteristics of the communications, such as a phase characteristic, a signal strength, a time of arrival, a time of flight, or an angle of arrival, or a combination thereof. The determined signal characteristics may be communicated or analyzed and then communicated to the object device 50 via a communication link 130 separate from the communication link between the remote devices 20 and the object device 50. Additionally, or alternatively, the remote device 20 may establish a direct communication link with one or more of the sensors 40, and the one or more signal characteristics may be determined based on this direct communication link.

The one or more sensors 40 may be disposed in a variety of positions on the object 10, such as the positions described herein, including for instance, one or more sensors 40 in the door panel and one or more other sensors in the B pillar.

The object device 50 and the one or more sensors 40 may be powered via a power bus 120. The power bus 120 may be daisy chained from one device to the next as depicted in the illustrated embodiment of FIG. 6. Alternatively, the power bus 120 may be provided in the form of a star connection with power being supplied from one location to multiple locations via separate connections. Power supply and associated architecture is not limited to any one type—for instance, power may be distributed via both daisy chain and star connection configurations. The power bus 120 may be coupled to a power supply 110 to facilitate distributing power to devices in the system 100.

The system 100 in the illustrated embodiment may be configured to determine location information in real-time with respect to the remote device 20. In the illustrated embodiment of FIG. 5, a user may carry the remote device 20 (e.g., a smartphone). The system 100 may facilitate locating the remote device 20 with respect to the object 10 (e.g., a vehicle) in real-time with sufficient precision to determine whether the user is located at a position at which access to the object 10 or permission for an object 10 command should be granted.

Figure 6:
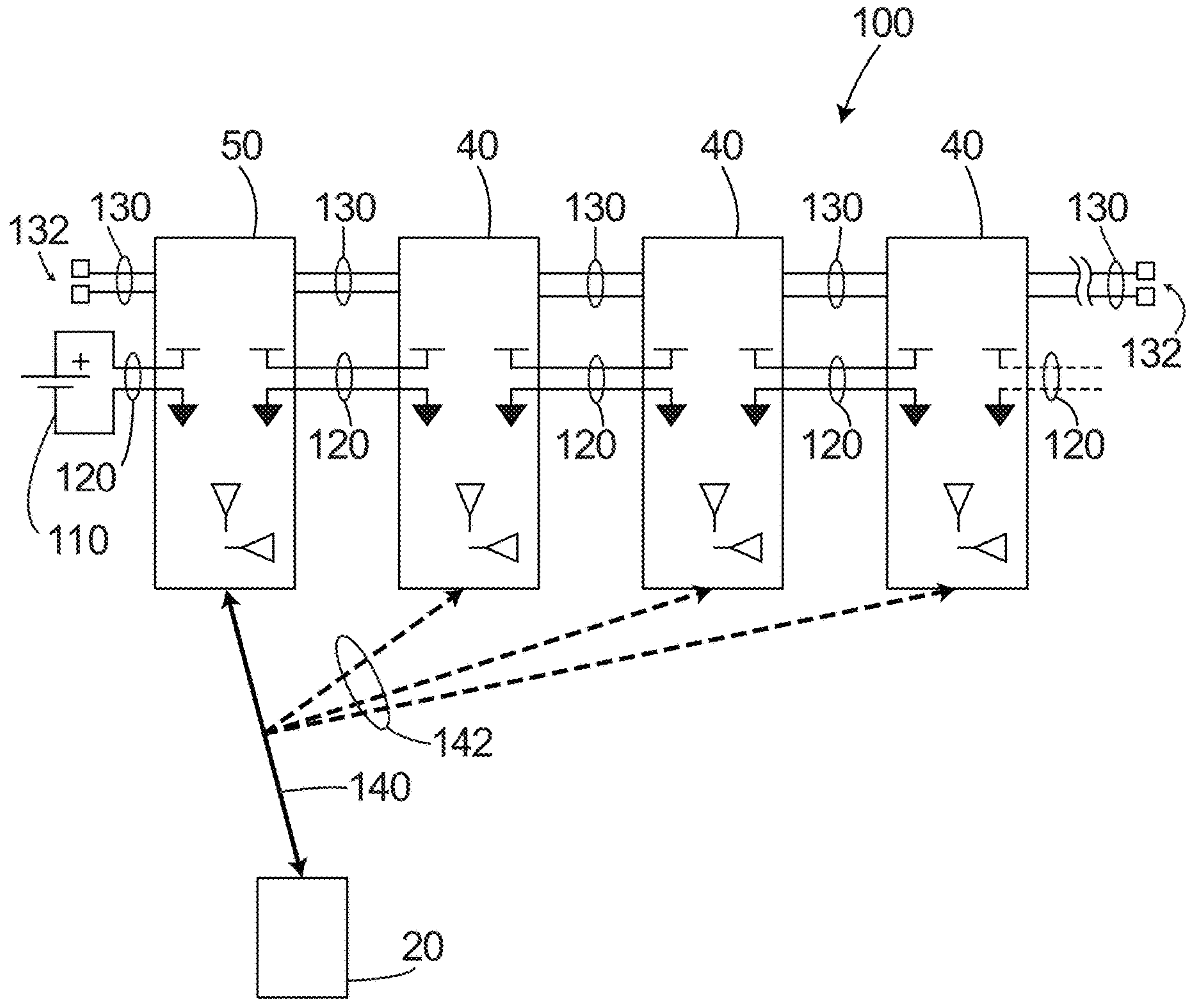
FIG. 6 shows the system in accordance with one embodiment.

In the illustrated embodiment of FIG. 6, the communication link 130 is distributed from one device to another and includes a terminator 132 at each end. The communication link 130 among the devices may be a shared link or a separate link for each device, or a combination thereof. For instance, the communication link 130 may be shared among two or more devices as depicted, and additionally or alternatively, the communication link 130 may be established separately from one device to another device. A device may communicate via more than one separate communications link 130, and may be configured to relay communications from one communication link 130 to another communication link 130.

The remote device 20 may communicate wirelessly with the object device 50 via a communication link 140, such as a BLE communication link or an Ultra-Wideband (UWB) communication link. The plurality of sensors 40 may be configured to monitor (sniff) the communications of the communication link 140 between the remote device 20 and the object device 50 as shown in phantom lines 142. The monitored communications or transmissions may correspond to a tone exchange (one-way or two-way) between the object device 50 and the remote device 20. Based on the monitored communications, a sensor 40 may determine one or more signal characteristics of the communications as described herein, including a phase characteristic of the communications. Additional or alternative signal characteristics include a signal strength, time of arrival, time of flight, angle of arrival, or a combination thereof. The determined signal characteristics may be communicated or analyzed and then communicated to the object device 50 via the communication link 130 separate from the communication link 140 between the remote device 20 and the object device 50.

Additionally, or alternatively, as described herein, the remote device 20 may establish a direct communication link with one or more of the sensors 40, and the one or more signal characteristics may be determined based on this direct communication link. For instance, as described herein, the remote device 20 and a sensor 40 may perform a tone exchange as a basis for determining a distance between the sensor 40 and the remote device 20. The direct communication link may be established according to the BLE protocol; however, the present disclosure is not so limited—the direct communication link may be any type of link or links, including Ultra-Wideband (UWB).

It is to be understood that an object 10, such as a vehicle, may include a number of sensors 40 (A-F) that can be greater than or less than the number shown in the illustrated embodiment of FIGS. 1 and 2. Depending on the implementation, some number of sensors 40 may be integrated in a vehicle.

As described herein, one or more signal characteristics, such as a phase characteristic, a signal strength, time of arrival, time of flight, and angle of arrival, may be analyzed to determine location information about the remote device 20 relative to the object 10, as an aspect of the object 10, or the object device 50, or a combination thereof. For instance, a phase rotation of a tone transmission, and optional retransmission, or a phase characteristic indicative of a phase rotation may form the basis for determining a distance between an object device 50 or a sensor 40 and the remote device 20. Additional examples of signal characteristics include time difference of arrival or the angle of arrival, or both, among the sensors 40 and the object device 50 may be processed to determine a relative position of the remote device 20. The positions of the one or more antenna arrays 30 relative to the object device 50 may be known so that the relative position of the remote device 20 can be translated to an absolute position with respect to the antenna arrays 30 and the object device 50.

Additional or alternative types of signal characteristics may be obtained to facilitate determining position according to one or more algorithms, including a distance function, trilateration function, a triangulation function, a lateration function, a multilateration function, a fingerprinting function, a differential function, a time of flight function, a time of arrival function, a time difference of arrival function, an angle of departure function, a geometric function, or any combination thereof.

II. System Device Overview

Figure 7:
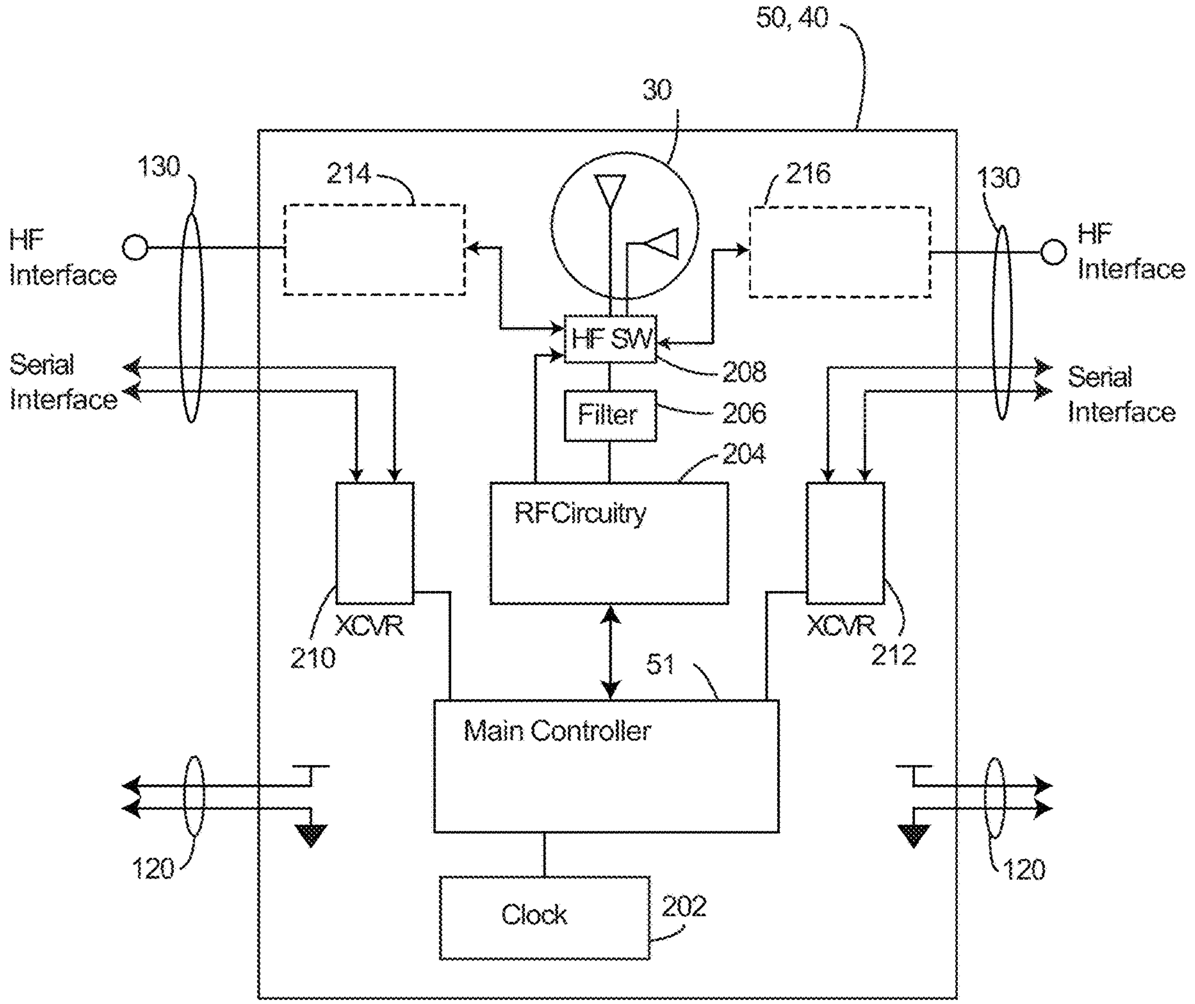
FIG. 7 shows a device of the system in accordance with one embodiment.

In the illustrated embodiment of FIG. 7, the object device 50 in one aspect is shown in further detail. The structure and configuration of described in conjunction with FIG. 7 may be incorporated into a sensor 40 or an object device 50—but for purposes of disclosure, the structure and configurations described in conjunction with the object device 50.

The object device 50 in the illustrated embodiment of FIG. 7 includes several components, one or more of which may be provided in a commercial embodiment. The object device 50 in some instances may be described as an anchor disposed on the object 10.

The object device 50 may include RF circuitry 204 operable to control transmission and reception of HF signals. The RF circuitry 204 may be operably coupled to an antenna array 30, which may include one or more antennas. An example configuration of an antenna array 30 is described in U.S. Nonprovisional patent application Ser. No. 18/096,666 to Osman Ahmed et al., entitled SYSTEM AND METHOD FOR COMMUNICATING, filed Jan. 13, 2023—the disclosure of which is incorporated herein by reference in its entirety.

The RF circuitry 204 may be configured to supply or receive high-frequency signals from the antenna array 30 via filter circuitry 206 and a HF switch 208. The filter circuitry 206 may condition the signal output from the RF circuitry 204 for driving the antenna array 30. Conversely, the filter circuitry 206 may condition a signal received from the antenna array 30 for processing by the RF circuitry 204. The HF switch 208 may selectively direct input and output of HF signals, including HF supplied to and received from the antenna array 30.

In one embodiment, the RF circuitry 204 may be configured according to one embodiment to transmit and receive signals via a high-frequency interface of the communication link 130. Transmission and reception of HF signals in one embodiment may enable an object device 50 to communicate via a physical medium according to a communication protocol that is the same or similar to the one utilized by the antenna array 30 in the RF circuitry 204. For instance, the object device 50 may transmit and receive communications via a physical medium defined by the high-frequency interface that correspond to the BTLE communications, while also transmitting and receiving communications via the antenna array 30 that correspond to BTLE communications.

The HF switch 208 may selectively direct output from the RF circuitry 204 to the high-frequency interface of the communication link 130, and selectively direct input from the high-frequency interface of the communication link 130 to the RF circuitry 204. In one embodiment, the HF interface may be a single ended configuration, such as a coaxial conductor arrangement. Alternatively, the HF interface may be differential, and optionally include conditioning circuitry 214, 216 (e.g., a balun and/or an impedance transformer) for translating between a single ended output from the HF switch 208 and a differential output of the high-frequency interface of the communication link 130.

In one embodiment, the high frequency switch 208 and the conditioning circuitry 214, 216 may be absent, such that the communication link 130 is provided via a serial interface or another type of communication interface, as described herein.

In the illustrated embodiment, the object device 50 is configured to transmit and receive communications via separate high-frequency interfaces provided by separate communication links 130. In other words, the two communication links 130 in the illustrated embodiment are isolated from each other, such that communications received on one communication link 130 are not inherently transmitted or seen on the other communication link 130. As discussed herein, the object device 50 may be configured to relay communications from one of the communication links 130 to the other of the communication links 130. For example, communications received via one high-frequency interface may be directed to the RF circuitry 204, and may be related to the other high-frequency interface via the RF circuitry 204. The HF switch 208 may be in transition from one state to another state to facilitate relaying of such communications. It is to be understood, however, that in one or more embodiments described herein, communications transmitted via one of the communication links 130 may inherently pass to the other of the communication links 130.

The object device 50 may include a main controller 51 and may be configured to direct operation of the RF circuitry 204, as described herein. In one embodiment, the main controller 51 may control a tone exchange via the antenna array 30 to facilitate determining a one-way range or two-way range determination with respect to the remote device 20. Additionally, or alternatively, the object device 50 may sniff communications that pertain to a tone exchange and that occur between another object device (e.g., a sensor 40) and the remote device 20. In one embodiment, a sensor 40 may be configured to monitor or sniff communications that pertain to a tone exchange and that occur between the object device 50 and the remote device 20.

The main controller 51 may further direct transmission and reception of communications via the HF interface of the one or more communication links 130. As an example, the main controller 51 may direct transmission and reception of BTLE communications via the HF interface of the communication link 130. Information transmitted via the high-frequency interface of the communication links 130 may relate to one or more signal characteristics obtained with respect to communications received and/or transmitted via the antenna array 30. As an example, the information transmitted via the communication link 130 may be indicative of a phase rotation determined with respect to communications received and/or transmitted via the antenna array 30.

Additionally, or alternatively, the main controller 51 may utilize the high-frequency interface of the communication links 130 for time synchronization or time offset determination purposes. As discussed herein, a phase characteristic of a tone exchange is based at least in part on a time reference of the device. And because time is translatable to distance (and conversely distance to time) with respect to electromagnetic waves, determining the reference time of the sensor 40 may facilitate enhancing accuracy with respect to determining the phase characteristic and distance between the remote device 20 and the object device 50.

The object device 50 may include a clock 202 that operates an oscillator for the sensor 40 and generates one or more timing signals for operation of aspects of the object device 50, including the main controller 51 and the RF circuitry 204. In one embodiment, the clock 202 may be configured to generate a timing signal that the main controller 51 and/or the RF circuitry 204 may use as a basis for transmitting a tone exchange signal (e.g., an initiator signal). As described herein, the tone exchange signal may include transmissions according to a plurality of frequencies and a phase rotation with respect to such transmissions and may form the basis for a distance determination with respect to the object device 50 and the remote device 20.

In one embodiment, the object device 50 includes first and second transceivers 210, 212 coupled respectively to serial interfaces of the communication links 130. The transceivers 210, 212 may be CAN transceivers, but the present disclosure is not so limited. The transceivers 210, 212 may facilitate any type of serial or non-serial communications via the communication links 130, including but not limited to RS-485, LIN, Vehicle Area Network (VAN), Fire Wire, I2C, RS-232, RS-485, and Universal Serial Bus (USB).

The first and second transceivers 210, 212 may enable communications among devices (e.g., the object device 50 and a sensor 40). For instance, the object device 50 may transmit to a sensor 40, via the serial interface of the communication link 130, connection parameters for the communication link 140 to enable the sensor 40 to monitor communications between the object device 50 and the remote device 20. A sensor 40 may receive such communications via the first transceiver 210 and relay the communications to another device (e.g., another sensor 40) via the second transceiver 212.

Optionally, the object device 50 may include a communication link 130 configured with a serial interface without the high-frequency interface or a high-frequency interface without the serial interface. Communications described herein with respect to one interface and not the other may be communicated via the interface provided by the communication link 130. For instance, the communication link 130 may include a high-frequency interface without the serial interface, and communications described in connection with the serial interface may be transmitted via the high-frequency interface. The high frequency interface and/or the serial interface may be wired or wireless.

The communication interface of the main controller 51 may facilitate any type of communication link, including any of the types of communication links described herein, including wired or wireless. The communication interface may facilitate external or internal, or both, communications. For instance, the communication interface may be coupled to the RF circuitry 204 to enable communications via one or more of the antenna array 30 and the HF interface of the communication link 130.

As another example, the communication interface of the main controller 51 may facilitate a wireless communication link with another system component in the form of the remote device 20, such as wireless communications according to the Wi-Fi standard or UWB, or any combination thereof. As another example, the communication interface of the main controller 51 may include a display and/or input interface for communicating information to and/or receiving information from the user.

III. Phase-Based Ranging (PBR)

Figure 9:
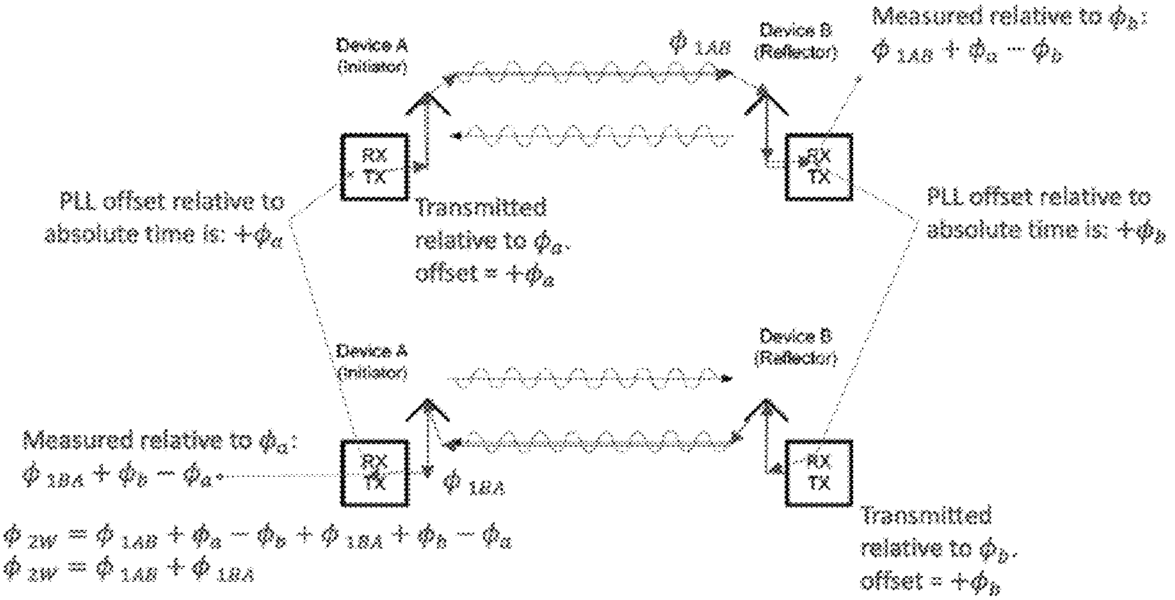
FIG. 9 shows communications according to one embodiment.

In the illustrated embodiment of FIG. 9, a tone exchange according to a plurality of frequencies f_0, f_1, f_2, f_3 is depicted with the object device 50 being the initiator or device A and the remote device 20 being a reflector or device B. It is noted that device A and/or device B may be different devices in the system 100. For instance, device A may be a sensor 40 and device B may be the remote device 20. As another example, device A may be an object device 50 and device B may be a sensor 40. In using different frequencies for the tone exchange, a type of channel sounding for ranging approach is utilized.

Figure 8:
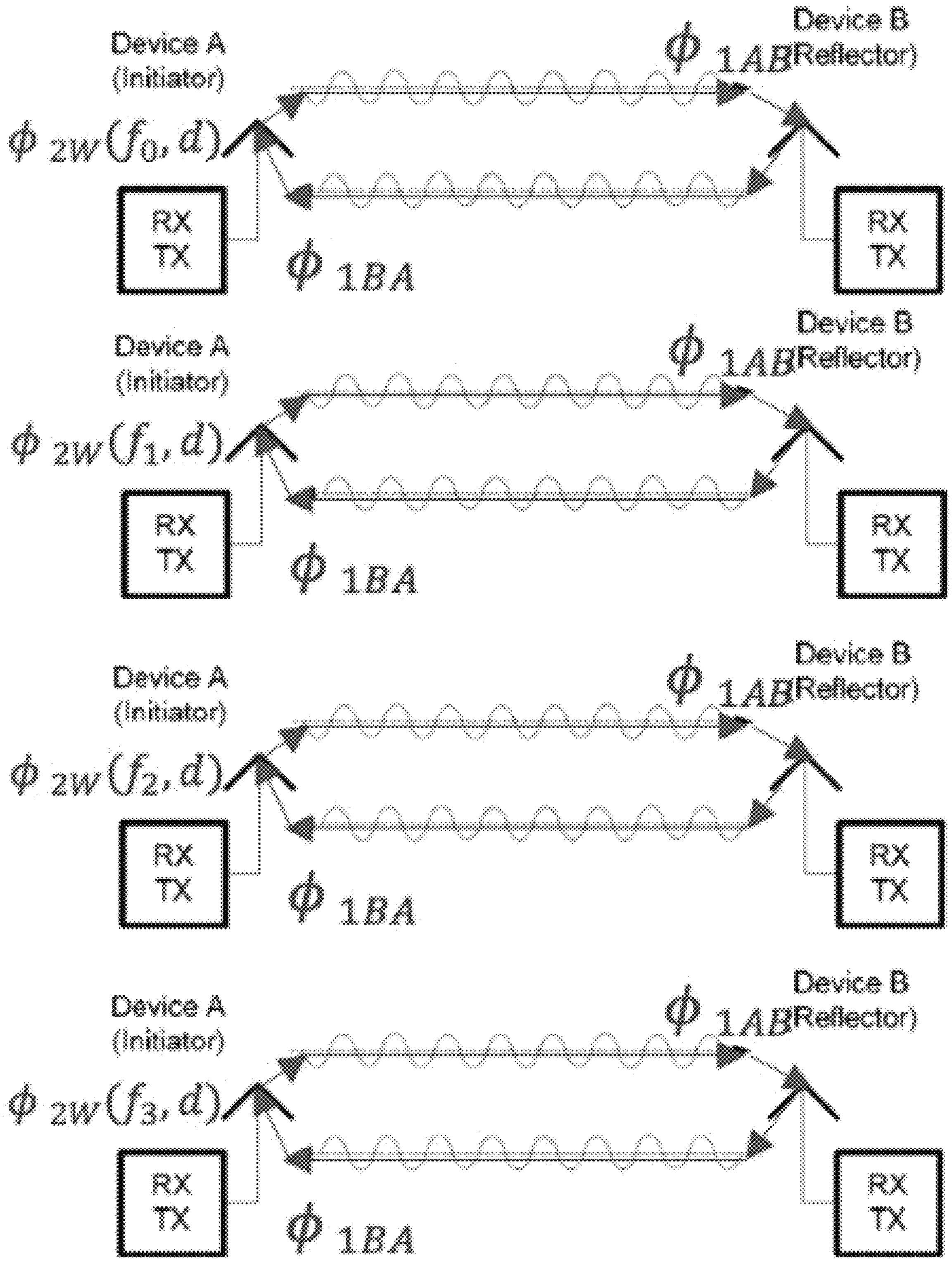
FIG. 8 depicts communications according to one embodiment.

In FIG. 8, the tone exchange may involve device A transmitting an initiator signal according to a frequency, device B receiving the initiator signal, device B transmitting a reflector signal based on the initiator signal according to the same frequency, and device A receiving the reflector signal. Based on a phase characteristic of the initiator signal and/or the reflector signal measured respectively by the device B or device A, a phase rotation of the initiator signal and/or the reflector signal may be determined, enabling a distance determination with respect to device A and B.

A single tone exchange according to frequency f_0 is depicted in further detail in FIG. 9, and discussed in conjunction with one or more phase characteristics and related properties of the tone exchange. For purposes of this example, the frequency f_0 is identified as 2.4 GHz—however the frequency may vary. At this example frequency the wavelength of the signal is approximately 12.5 cm. By knowing the total phase rotation, there and back for the initiator and reflector signal, distance can be determined. For instance, if the total phase of a two-way exchange (ϕ_AB+ϕ_BA or ϕ_2W) is measured as 90 deg. (¼ of a full rotation), the two-way distance can be determined as 12.5 cm*¼+12.5 cm*N, with N being the number of wraps or full rotations of the initiator and reflector signals.

If the tone exchange is conducted for a second frequency f_1, different from f_0, a different measured phase will result, and the wavelength will be different due to the change in frequency. The difference in measured phase coupled with the known frequency difference (f_1-*f*_0) may facilitate determining N, the number of wraps or full rotations of the initiator and reflector signals.

In the illustrated embodiment of FIG. 9, there may be an initial phase offset relative to a timing signal. This phase offset of device A as well as the phase offset of device B for a two-way exchange cancel out in determining a two-way phase rotation.

In the illustrated embodiment, the initiator (device A) transmits and receives with a relative phase offset of ϕa, and the reflector (device B) transmits and receives with a relative phase offset of ϕb. ϕa is the inherent phase offset of the initiator, and ϕb is the inherent phase offset of the reflector. The one-way phase rotation ϕ1W=ϕ1AB, with the phase from A, measured at B, when ϕa and ϕb are 0 or the same, and the one-way phase rotation ϕ1W=ϕ1BA, with the phase from A, measured at B, when ϕa and ϕb are 0 or the same. However, when the ϕa and ϕb are not the same, these offsets cause the measured phase at B and at A to be different. This is because, when going from A to B, ϕa causes A to transmit late and ϕb causes B to measure late. ϕ1ABmeasured=ϕ1AB+ϕa−ϕb, when going from B to A, ϕb causes B to transmit late and ϕa causes A to measure late, with ϕ1BAmeasured=ϕ1BA+ϕb−ϕa. When these are summed together, the two-way rotation can be determined as:

$$\Phi 2W = \phi 1ABmeasured + \phi 1BAmeasured = \phi 1AB + \phi a - \phi b + \phi 1BA + \phi b - \phi a$$

It can be seen that ϕa and ϕb cancel out. Switching to the Euler notation yields the same result with the phase offsets cancelling when the exponents are combined, such that the two-rotation can be determined as:

$$\Phi 2W = e^{j\frac{4\pi fd}{c}}$$

The notation for determining one-way and two-way rotations can vary depending on documentation parameters and the method utilized for conceptualizing phase. For instance, phase can be described relative to the IQ domain, where $I+Qj=X+Yj=\Phi=\cos(\phi)+j\sin(\phi)=e^{-j\phi}$. Here, Φ, capital PHI, is the complex representation of the phase in radians or ϕ, lowercase phi. The Φ_1AB_measured value may be called the reflector Phase Correction Term (PCT), or PCT_B, while the Φ_1BA_measured value may be called PCT_A. The two-way rotation Φ2W=Φ1_AB_measured·Φ1_BA_measured.

Because the wavelength for high frequency transmissions can be short relative to the target distance being measured, the transmissions wrap or complete full phase rotations such that total phase rotation embodied as the total distance cannot be measured directly from a phase in the input stage of the RF circuitry 204. For instance, for a carrier frequency at 2.4 GHz, the phase rotation wraps around 2π with d in the range of 12 cm. A phase measurement in the input stage of the RF circuitry 204 may indicate a phase within the range 0-2π, but the phase measurement may not directly indicate the number of phase rotation wraps.

To measure longer distances without ambiguity, two different frequencies (f0, f1) can be used at two different instants i in time (i0, i1) to compute two different phases rotations. The two different phase rotations can be used to measure the distance. A phase-based distance determination is described in conjunction with two different frequencies—however, it is to be understood that phase measurements for a plurality of frequencies (including more than two frequencies) may be used to enhance accuracy of the distance determination.

In the case of utilizing two or more different frequencies (f_0, f_1) as a basis for determining distance, as depicted in FIG. 8, the initiator may conduct two tone exchanges to measure a two-way phase rotation (ϕ_2w) at the two frequencies (f_0, f_1). In this example, ϕ_2w (f_0, d)=ϕ_1AB (f_0, d)+ϕ_1BA (f_0, d), where the phase characteristic, ϕ_1AB (f_0, d) is measured in the initiator and the phase characteristic, ϕ_1BA (f_0, d) is measured in the reflector. And, ϕ_2w (f_1, d)=ϕ_1AB (f_1, d)+ϕ_1BA (f_1, d), where the phase characteristic, ϕ_1AB (f_1, d) is measured in the initiator and the phase characteristic, ϕ_1BA (f_1, d) is measured in the reflector. The difference in the two-way phase measurements, ϕ_2w (f_0, d)−ϕ_2w (f_0, d), is related to the difference in frequency and distance as follows:

$$\Delta\phi_{2W} = \frac{4\pi d\Delta f}{c}\bmod 2\pi$$

Based on the difference in the two-way phase measurements, distance and time delay can be determined as follows:

$$d = \frac{c\Delta\phi_{2W}}{4\pi\Delta f}\bmod\frac{c}{2\Delta f}$$

$$t = \frac{d}{c} = \frac{\Delta\phi_{2W}}{4\pi\Delta f}\bmod\frac{1}{2\Delta f}$$

Figure 10:
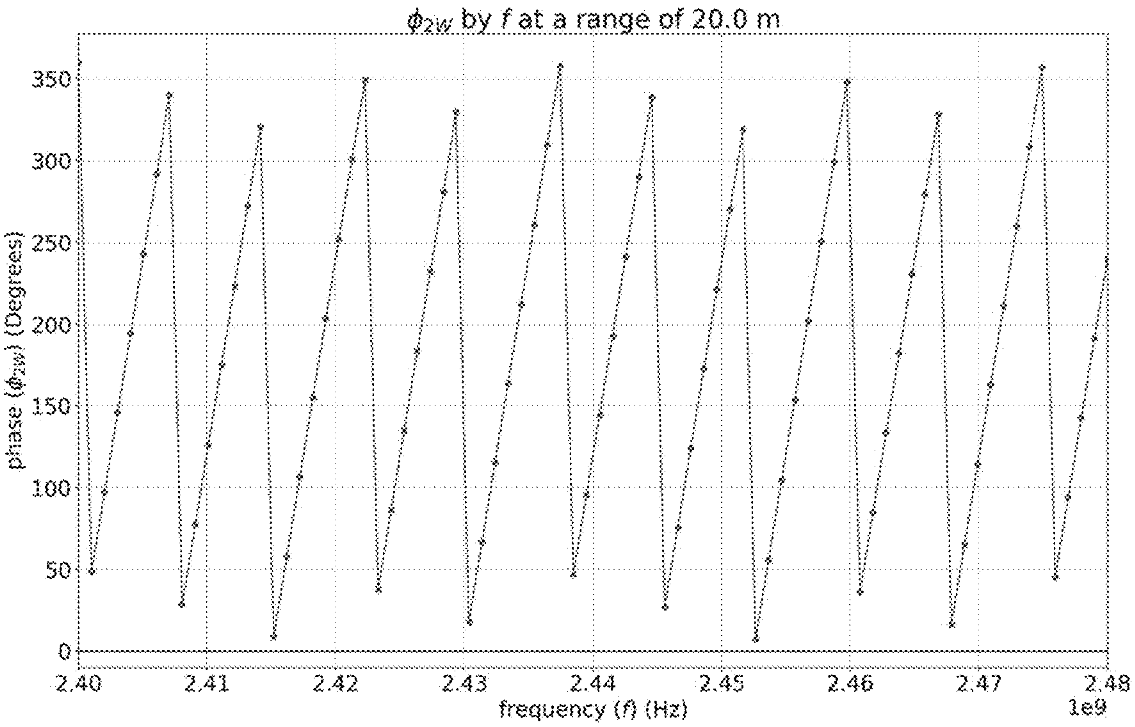
FIG. 10 shows phase wrapping for communications according to one embodiment.

It is noted that from the relationship between two-way phase rotation, frequency, and distance, that the two-way phase rotation (ϕ_2w) wraps back to 0 with distance remaining constant and changing frequency. As a result, for multiple frequencies in a band (e.g., 2.4 GHz to 2.48 GHz), the two-way phase rotation may wrap back to 0 degrees zero or more times depending on the distance. The wrap distances for round trip or two-way phase rotation and a plurality of frequencies are depicted in the illustrated embodiments of FIG. 10. It can be seen specifically in FIG. 10 that, for a distance of 20 m, a 2.4 GHz to 2.48 GHz signal wraps at 1 MHz frequency steps. The slope of the two-way phase rotation may also depend on the distance. In one embodiment, distance may be determined based at least in part on the slope and/or the frequency at which the two-way phase rotation wraps.

The present disclosure is not limited to determining two-way phase rotation. The one-way phase rotation (ϕ_1w) may be conceptualized in a similar manner, with the distance and time delay being determined as follows:

$$d = \frac{c\Delta\phi_{1W}}{2\pi\Delta f}\bmod\frac{c}{\Delta f}$$

$$t = \frac{d}{c} = \frac{\Delta\phi_{1W}}{4\pi\Delta f}\bmod\frac{1}{\Delta f}$$

It is noted, however, that in order to obtain an accurate one-way ranging delta between the transmission phase and the reception phase, the initiator and the receiver may need to be synchronized in time. With two-way ranging, lack of synchronicity may not be necessary because differences in time bases for the two devices may cancel out.

IV. Channel Sounding Handoff

In one embodiment, a system and method for improving the responsiveness of a Passive Access Phone-as-a-Key (PaaK) system, such as the system 100, may be provided through implementing a channel sounding (CS) handoff. The system 100 may be configured to enhance or optimize the system response time to user interactions, ensuring a seamless and efficient user experience. In one embodiment, this may be provided by strategically reducing the number of operations and measurements performed within a designated time frame. The benefits of this approach include lower overall power consumption, improved coexistence with other Bluetooth devices, enhanced system performance in terms of ranging and/or localization, and cost-effective hardware.

In one embodiment, the system may be configured for access control systems, specifically Passive Access Phone-as-a-Key (PaaK) systems, with a focus on responsiveness optimization through the introduction of a CS handoff.

For a PaaK system according to one embodiment of the system 100 to be effective, responsiveness is a concern. The timely execution of operations may facilitate maintaining a positive user experience. CS handoff, implemented according to one embodiment, may streamline the responsiveness of the system 100 by strategically curbing the number of operations and measurements conducted over a specified time period.

The purpose of implementing CS handoff in a system 100 is to enhance responsiveness. Specifically, the system 100 may achieve this by selectively reducing the number of operations and measurements, ensuring a prompt and efficient response to user-initiated actions.

The benefits arising from the implementation of CS handoff in a system 100 include:

1. Lower Power Consumption: The enhanced or optimized operation strategy may result in reduced overall power consumption, contributing to energy efficiency and prolonged system longevity.
2. Improved Coexistence with Bluetooth Devices: Enhanced coexistence with other Bluetooth devices may be provided through strategic reduction in operations, mitigating interference issues and ensuring smooth communication.
3. Enhanced Ranging and Localization: The performance of the system 100 in terms of ranging and localization may be significantly improved, providing users with more accurate and reliable results.
4. Cost-Effective Hardware: The system 100 in one embodiment may allow for the utilization of less powerful and cost-effective hardware, promoting economic feasibility without compromising system performance.

In one embodiment of the present disclosure, full channel sounding procedures are selectively performed with a subset of sensors 40 (e.g., anchors). Criteria such as proximity determined through previous measurements may guide the selection of anchors 40 near the remote device 20. In another embodiment, channels based on RF frequencies may be selectively activated from subsets of anchors 40. This configuration enables avoidance of poorly performing channels near interference sources or frequency-dependent nulls in the environment, enhancing or optimizing performance of the system 100.

Channel Sounding may be selective in crowded parking lots. Consider a scenario where a user approaches the vehicle 10 in a densely populated parking lot. The CS handoff implementation according to one embodiment may ensure that the system 100 intelligently performs channel sounding procedures with a subset of anchors 40. Previous measurements may have facilitated a determination that certain anchors 40 are nearest to the remote device 40 (e.g., the user's phone). Despite the crowded RF environment, the system 100 may efficiently unlock the vehicle door 14, demonstrating the ability to provide a swift and reliable response in challenging conditions.

In one embodiment, dynamic channel selection may be conducted near interference sources. The system 100 may dynamically adjust channel configurations based on RF frequencies. When the user is surrounded by interference sources, such as other Bluetooth devices or Wi-Fi signals, the system 100 may selectively activate channels from subsets of anchors 40 that avoid poorly performing channels. This intelligent adaptation ensures a secure and efficient unlocking process, even in the presence of environmental challenges.

In one embodiment, the system may be configured to enhance the responsiveness through CS handoff. The outlined benefits, coupled with illustrative examples, underscore the potential for widespread application in access control systems, providing an improved and efficient user experience.

Figure 11:
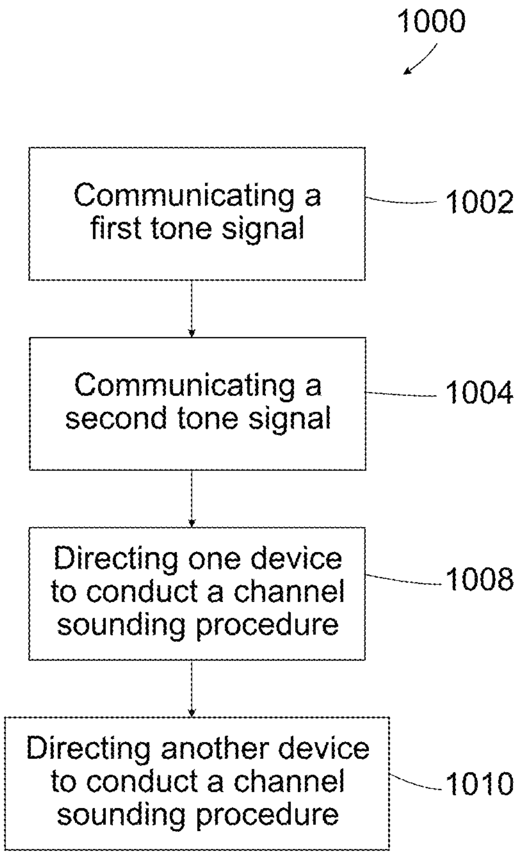
FIG. 11 shows a method of operation according to one embodiment.

A method of operation according to one embodiment is shown in FIG. 11 and generally designated 1000. The method 1000 includes communicating a first tone signal between a remote device and a first device disposed in a fixed position relative to an object. Step 1002. The method 1000 may also include communicating a second tone signal between the remote device and a second device disposed in a fixed position relative to an object. Step 1004.

The method 1000 may include directing one of the first and second devices to conduct a channel sounding procedure based on the respective one of the first and second tone signals. Step 1008.

The method 1000 may include directing the other of the first and second devices to conduct the channel sounding procedure based on the respective one of the first and second tone signals. Step 1010. For instance, the method may include directing the one of the first and second devices to transition the channel sounding procedure to the other of the first and second devices.

In one embodiment, the method 1000 may include determining a first phase characteristic and a second phase characteristic of the first tone signal at a first frequency and a second frequency. The first and second phase characteristics may be indicative of a first phase rotation of the first tone signal between the first device and the remote device. The method 1000 may also include determining a first distance between the first device and the remote device based on the first phase rotation of the first tone signal.

In one embodiment, the method 1000 may include determining a third phase characteristic and a fourth phase characteristic of the second tone signal at a third frequency and a fourth frequency. The third and fourth phase characteristics may be indicative of a second phase rotation of the second tone signal between the second device and the remote device. The method 1000 may also include determining a second distance between the second device and the remote device based on the second phase rotation of the second tone signal.

The method 1000, in one embodiment, may include at least one of directing the first device to dynamically adjust device priorities based on real time conditions and directing the first device to prioritize according to round robin scheduling.

In one embodiment, the method 1000 may include transitioning from a first channel sounding configuration for coarse localization to a second channel sounding configuration for fine localization and/or utilizing round-robin or intelligent selection to transition from the first device to a second device configured to conduct the channel sounding procedure.

V. Orchestration of CS Procedures in Multi-Device Systems for Efficient Resource and Radio Utilization on Anchors with Dynamic Device Prioritization and Subsystem Component Verification The system 100 in one embodiment may be configured to extend its focus to the orchestration of Bluetooth Channel Sounding (BLE CS) procedures within multi-device systems, with an additional emphasis on the verification of subsystem components. The system 100 may be configured to enhance or optimize resource and radio usage on anchors 40. This configuration may facilitate maintaining the efficiency of the system 100, particularly in scenarios where multiple devices may concurrently interact with the system 100. In one embodiment, the system 100 described herein may incorporate dynamic device prioritization and operate to verify subsystem components.

In one embodiment, the system 100 may be configured for efficient resource and radio usage on anchors 40. The system 100 may implement a systematic orchestration of BLE CS procedures to achieve enhanced or optimal resource and radio utilization on anchors 40. This may involve planning of when and how channel sounding operations are performed, reducing or minimizing potential conflicts and contention.

In one embodiment, the system 100 may be configured for dynamic device prioritization in conflict scenarios. Conflict scenarios, where the same anchor 40 needs to simultaneously listen to multiple devices, may be addressed through dynamic prioritization mechanisms. These mechanisms may dynamically adjust device priorities based on real-time conditions, ensuring fair and effective management of conflicting demands on anchor resources. Prioritization methods include factors such as device priority, round-robin scheduling, or other dynamically adjustable criteria.

In one embodiment, the system 100 may be configured to provide dynamic device prioritization for simultaneous listening. In scenarios where the same anchor 40 needs to listen to multiple devices concurrently, the system 100 may employ dynamic prioritization. This may ensure that conflicting demands are managed in real-time, adapting device priorities based on the immediate requirements of the system 100. The prioritization methods can be adjusted dynamically, providing flexibility and responsiveness to changing conditions.

In one embodiment, the system may be configured for subsystem component verification. The system 100 may be configured for verifying subsystem components, such as anchors 40. In one embodiment, the system 100 may be configured to automatically determine if anchors 40 have been moved or manipulated. This verification may be provided through the analysis of BLE CS procedure output. By assessing changes in the output patterns, the system 100 may autonomously detect alterations to anchor positions, ensuring the integrity of the subsystem components.

The system 100 may be configured according to one or more embodiments of the system described in U.S. Pat. No. 11,272,559, entitled SYSTEM AND METHOD OF DETERMINING REAL-TIME LOCATION, issued Mar. 8, 2022, to Smith—the disclosure of which is incorporated by reference herein in its entirety. One embodiment according to the present disclosure recognizes the challenges posed by multi-device scenarios and advances the orchestration of BLE CS procedures with a focus on dynamic device prioritization. Additionally, the introduction of subsystem component verification enhances the overall reliability and security of the system 100.

In one embodiment, the system 100 may be configured for enhanced or optimized resource utilization. Through the orchestration of BLE CS procedures, dynamic device prioritization, and subsystem component verification, the system 100 may provide an enhanced or optimized allocation of resources on anchors 40, reducing or minimizing contention and enhancing overall system efficiency.

In one embodiment, the system 100 may be configured for responsive multi-device management. Use of dynamic device prioritization in conflict scenarios may enable responsive management of multiple devices interacting with the system 100 simultaneously, ensuring a seamless user experience.

In one embodiment, the system may be configured for enhanced security through component verification. The subsystem component verification aspect may ensure the integrity and security of the system 100 by autonomously detecting any unauthorized movement or manipulation of anchors 400, thereby enhancing safeguards against potential security threats.

The system 100 in one embodiment may incorporate BLE CS orchestration, dynamic device prioritization, and subsystem component verification in a multi-device system. The system may establish a comprehensive framework for efficient and secure operation in PaaK systems, offering a robust configuration for resource enhancement or optimization, responsive multi-device management, and enhanced security through component verification.

VI. System and Method for Enhancing PAAK System Localization and Security Through Dynamic BLE Channel Sounding Procedures The system 100 in one embodiment may leverage a combination of coarse localization with fine localization to confirm position. The system 100 may dynamically adapt BLE CS procedures based on the quality of data and/or the position/velocity of the device. Key features may include round-robin or intelligent anchor selection using predetermined or dynamic algorithms. Coarse localization may utilize BLE CS short procedures (e.g., RTT only, PBR, or a combination), and fine localization employs longer BLE CS procedures (PBR+RTT). Secure ranging procedures, including the use of secure RTT (RTT Type 4), may be incorporated to thwart or mitigate relay attacks, ensuring a secure wakeup mechanism. Selective algorithms may cater to varying performance needs, differentiating between secure and non-secure ranging procedures.

In one embodiment, the system 100 may be configured to provide access control systems, such as a PaaK system, with a focus on dynamic localization and security enhancement through BLE channel sounding procedures.

In one embodiment, the system 100 may be configured for efficient and secure localization, ensuring reliable access control. Dynamic BLE CS procedures may be utilized by the system 100 by tailoring to the data quality and device position, combining coarse and fine localization techniques.

In one embodiment, the system 100 may provide localization and security. This may be achieved by dynamically adjusting BLE CS procedures based on data quality and device position/velocity, utilizing a combination of coarse and fine localization methods.

In one embodiment, the system 100 may be configured for adaptive localization procedures. The system 100 may provide dynamic adjustment of BLE CS procedures to ensure adaptive localization, enhancing or optimizing the use of coarse and fine methods based on real-time data quality and device position/velocity.

In one embodiment, the system 100 may be configured for efficient anchor selection. The system 100 may utilize round-robin or intelligent anchor selection, enhancing efficiency through predetermined or dynamic algorithms. This may ensure enhanced or optimal utilization of available anchors for localization procedures.

In one embodiment, the system 100 may be configured for enhanced security measures. Secure RTT (e.g., RTT Type 4) may be implemented to fortify the system 100 against relay attacks. This secure wakeup mechanism may operate within a defined tolerance, enabling robust security without compromising system performance.

In one embodiment, the system 100 may be configured for selective ranging algorithms. Selective algorithms differentiate between secure and non-secure ranging procedures, allowing the system 100 to tailor its approach based on distinct security requirements and performance levels.

Dynamic BLE CS procedure adjustment may be conducted by the system 100. In a scenario where a PaaK device (e.g., the Remote device 40) approaches a secured entry point, the system 100 may dynamically adjust BLE CS procedures based on the device's velocity and the quality of data received. Coarse localization may be employed for rapid position confirmation, switching to fine localization as the device approaches closer, enhancing or optimizing localization accuracy.

A secure wakeup mechanism may be implemented by the system 100. The system 100 may utilize secure RTT (RTT Type 4) for wakeup procedures, ensuring enhanced immunity against relay attacks within a defined tolerance. This example showcases the system's commitment to security without significantly compromising the efficiency of access control.

In one embodiment according to the present disclosure, the system 100 may enhance localization and security in PaaK systems through dynamic BLE CS procedures. By combining coarse and fine localization methods and implementing secure wakeup mechanisms, the system 100 may ensure adaptive and secure access control, setting an enhanced standard for performance and reliability in the field of passive access systems.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for determining a distance between a remote device and an object, the system comprising:

a first device disposed in a fixed position relative to the object, the first device including a first antenna system configured to receive and/or transmit a first tone signal from and/or to the remote device;

a second device disposed in a fixed position relative to the object, the second device including a second antenna system configured to receive and/or transmit a second tone signal from and/or to the remote device;

a control system configured to direct one of the first and second devices to conduct a channel sounding procedure based on the respective one of the first and second tone signals, said control system configured to direct the other of the first and second devices to conduct the channel sounding procedure based on the respective one of the first and second tone signals, wherein the control system is configured to determine a first phase characteristic and a second phase characteristic of the first tone signal at a first frequency and a second frequency, the first and second phase characteristics being indicative of a first phase rotation of the first tone signal between the first device and the remote device, the control system operable to determine a first distance between the first device and the remote device based on the first phase rotation of the first tone signal.

2. The system of claim 1 wherein the control system is configured to direct the one of the first and second devices to transition the channel sounding procedure to the other one of the first and second devices.

3. The system of claim 1 wherein the control system is configured to determine a third phase characteristic and a fourth phase characteristic of the second tone signal at a third frequency and a fourth frequency, the third and fourth phase characteristics being indicative of a second phase rotation of the second tone signal between the second device and the remote device, wherein the control system is operable to determine a second distance between the second device and the remote device based on the second phase rotation of the second tone signal.

4. A system for determining a distance between a remote device and an object, the system comprising:

a first device disposed in a fixed position relative to the object, the first device including a first antenna system configured to receive and/or transmit a first tone signal from and/or to the remote device;

a control system configured to direct the first device to conduct a channel sounding procedure based on the first tone signal, said control system configured to direct the first device to prioritize communications with the remote device over communications with one or more other devices, wherein the control system is configured to determine a first phase characteristic and a second phase characteristic of the first tone signal at a first frequency and a second frequency, the first and second phase characteristics being indicative of a first phase rotation of the first tone signal between the first device and the remote device, the control system operable to determine a first distance between the first device and the remote device based on the first phase rotation of the first tone signal.

5. The system of claim 4 wherein the control system is configured to direct the first device to dynamically adjust device priorities based on real-time conditions.

6. The system of claim 4 wherein the control system is configured to direct the first device to prioritize according to round-robin scheduling.

7. A system for determining a distance between a remote device and an object, the system comprising:

a first device disposed in a fixed position relative to the object, the first device including a first antenna system configured to receive and/or transmit a first tone signal from and/or to the remote device;

a control system configured to direct the first device to conduct a channel sounding procedure based on the first tone signal, said control system configured to direct the first device to change the channel sounding procedure based on at least one of the quality of data, the position of the remote device, and the velocity of the remote device, wherein the control system is configured to determine a first phase characteristic and a second phase characteristic of the first tone signal at a first frequency and a second frequency, the first and second phase characteristics being indicative of a first phase rotation of the first tone signal between the first device and the remote device, the control system operable to determine a first distance between the first device and the remote device based on the first phase rotation of the first tone signal.

8. The system of claim 7 wherein the control system is operable to transition from a first channel sounding configuration for coarse localization to a second channel sounding configuration for fine localization.

9. The system of claim 7 wherein the control system is configured to utilize round- robin or intelligent selection to transition from the first device to a second device configured to conduct the channel sounding procedure.

10. A method for determining a distance between a remote device and an object, the method comprising:

communicating a first tone signal between the remote device and a first device disposed in a fixed position relative to the object;

communicating a second tone signal between the remote device and a second device disposed in a fixed position relative to the object;

directing one of the first and second devices to conduct a channel sounding procedure based on the respective one of the first and second tone signals;

directing the other of the first and second devices to conduct the channel sounding procedure based on the respective one of the first and second tone signals; and determining a first phase characteristic and a second phase characteristic of the first tone signal at a first frequency and a second frequency, wherein the first and second phase characteristics are indicative of a first phase rotation of the first tone signal between the first device and the remote device.

11. The method of claim 10 comprising directing the one of the first and second devices to transition the channel sounding procedure to the other one of the first and second devices.

12. The method of claim 10 comprising determining a first distance between the first device and the remote device based on the first phase rotation of the first tone signal.

13. The method of claim 12 comprising determining a third phase characteristic and a fourth phase characteristic of the second tone signal at a third frequency and a fourth frequency, wherein the third and fourth phase characteristics are indicative of a second phase rotation of the second tone signal between the second device and the remote device.

14. The method of claim 13 comprising determining a second distance between the second device and the remote device based on the second phase rotation of the second tone signal.

15. The method of claim 10 comprising directing the first device to dynamically adjust device priorities based on real-time conditions.

16. The method of claim 10 comprising directing the first device to prioritize according to round-robin scheduling.

17. The method of claim 10 comprising transitioning from a first channel sounding configuration for coarse localization to a second channel sounding configuration for fine localization.

18. The method of claim 10 comprising utilizing round-robin or intelligent selection to transition from the first device to a second device configured to conduct the channel sounding procedure.

* * * * *